(12) United States Patent
Sakamoto et al.

(10) Patent No.: US 8,940,200 B2
(45) Date of Patent: *Jan. 27, 2015

(54) MANUFACTURING METHOD FOR LIGHT GUIDE PLATE

(75) Inventors: Mitsuhide Sakamoto, Tokyo (JP); Tatsuya Inaba, Aichi (JP); Noboru Iwanaga, Aichi (JP)

(73) Assignee: S. K. G. Co., Ltd., Aichi (JP)

( * ) Notice: Subject to any disclaimer, the term of this patent is extended or adjusted under 35 U.S.C. 154(b) by 453 days.

This patent is subject to a terminal disclaimer.

(21) Appl. No.: 13/266,364

(22) PCT Filed: Apr. 27, 2009

(86) PCT No.: PCT/JP2009/001922
§ 371 (c)(1),
(2), (4) Date: Jan. 6, 2012

(87) PCT Pub. No.: WO2010/125603
PCT Pub. Date: Nov. 4, 2010

(65) Prior Publication Data
US 2012/0091604 A1    Apr. 19, 2012

(51) Int. Cl.
*B29D 11/00*    (2006.01)
(52) U.S. Cl.
USPC ............... 264/1.27; 264/1.36; 425/174.2
(58) Field of Classification Search
USPC ............. 264/1.1, 1.24, 1.27, 1.36; 40/546; 425/174.2
See application file for complete search history.

(56) References Cited

U.S. PATENT DOCUMENTS 8,549,777 B2 * 10/2013 Inaba et al. .............. 40/546

FOREIGN PATENT DOCUMENTS

| JP | 2002-022964 A | 1/2002 |
| JP | 2004-200093 A | 7/2004 |
| JP | 2005-186557 A | 7/2005 |
| JP | 2007-042562 A | 2/2007 |
| JP | 3140292 U | 3/2008 |
| JP | 2008-305713 A | 12/2008 |

* cited by examiner

*Primary Examiner* — Mathieu D. Vargot
(74) *Attorney, Agent, or Firm* — Rabin & Berdo, P.C.

(57) ABSTRACT

A method for manufacturing a light guide plate, such as a sign or guide display board, that guides light incoming from a side surface of a substrate thereof and guides the light outgoing from a major surface thereof. The method includes arranging fabrication dots in a matrix shape at a rectangular distal surface of a ultrasonic fabrication horn, forming, on a major surface of the light guide plate substrate, reflection dots corresponding to the fabrication dots on the distal surface upon pressing the distal surface of the ultrasonic fabrication horn to the major surface of the light guide plate substrate, and forming the reflection dots in a prescribed range on the major surface of the light guide plate substrate by repeating formation of the reflection dot upon correlative movement of the ultrasonic fabrication horn within the major surface with respect to the light guide plate substrate.

8 Claims, 7 Drawing Sheets

(a) (b) (c)

(a)

(b)

(a)

(b)

MANUFACTURING METHOD FOR LIGHT GUIDE PLATE

FIELD OF THE INVENTION

This invention relates to a manufacturing method for light guide plate for double side light emission, capable of corresponding to a flexible dot fabrication using an ultrasonic multi-horn, as for manufacturing light guide plate made in relatively large size with a variety of kinds in a small quantity.

BACKGROUND OF THE INVENTION

As a light guide plate used to be built in a large screen television set among light guide plates producing an area light source using LED light, a structure of a light guide plate conventionally has been known in including reflection dots having a cross section in an reverse wedge shape that becomes wider as goes in a proceeding direction of light flux emitted from the light source. See, e.g., Patent Document #1.

Patent Document #1: Japanese Patent Application Publication No. 2008-305713

SUMMARY OF THE INVENTION

Problems to be Solved by the Invention

The structure described above, however, is hardly accommodated to arbitrary shapes during the production of a variety of kinds in a small quantity as well as to optical features suitable to the shapes. With the structure described above, there arises a problem that the takt time during the production may increase.

It is an object of the invention, in consideration of the technical problems described above, to provide a manufacturing method for light guide plate capable of accommodating to arbitrary shapes as well as to optical characteristics suitable to the shapes during the production of a variety of kinds in a small quantity, even where the light guide plate is relatively large in size used for such as signs or guide display boards, and also capable of grossly reducing the takt time during the production.

To solve the above described problems, the manufacturing method for light guide plate according to the invention has a feature that a manufacturing method for light guide plate for guiding light incoming from a side surface of a light guide plate substrate and guiding the light outgoing from a major surface thereof, comprises the steps of: arranging fabrication dots in a matrix shape at a rectangular distal surface of an ultrasonic fabrication horn; forming, on a major surface of the light guide plate substrate, reflection dots corresponding to the fabrication dots on the distal surface upon pressing the distal surface of the ultrasonic fabrication horn to the major surface of the light guide plate substrate; and forming the reflection dots in a prescribed range on the major surface of the light guide plate substrate by repeating formation of the reflection dot upon correlative movement of the ultrasonic fabrication horn within the major surface with respect to the light guide plate substrate.

Advantages of the Invention

According to the invented manufacturing method for light guide plate, the light guide plate, even though it is relatively large in size and to be used for signs or display boards, is capable of accommodating to an arbitrary shape or optical characteristics suitable for the shape during the production of a variety of kinds in a small quantity and also capable of grossly reducing the takt time during the production.

BRIEF DESCRIPTION OF THE DRAWINGS

FIG. 8 is a schematic view showing a state that, according to the first embodiment of the invention, top surface portion recess pattern traces formed on the top surface portion of the light guide plate and back surface portion recess pattern traces formed on the back surface portion are seen through.

EMBODIMENTS IN WHICH THE INVENTION IS EMPLOYED

Figure 1:
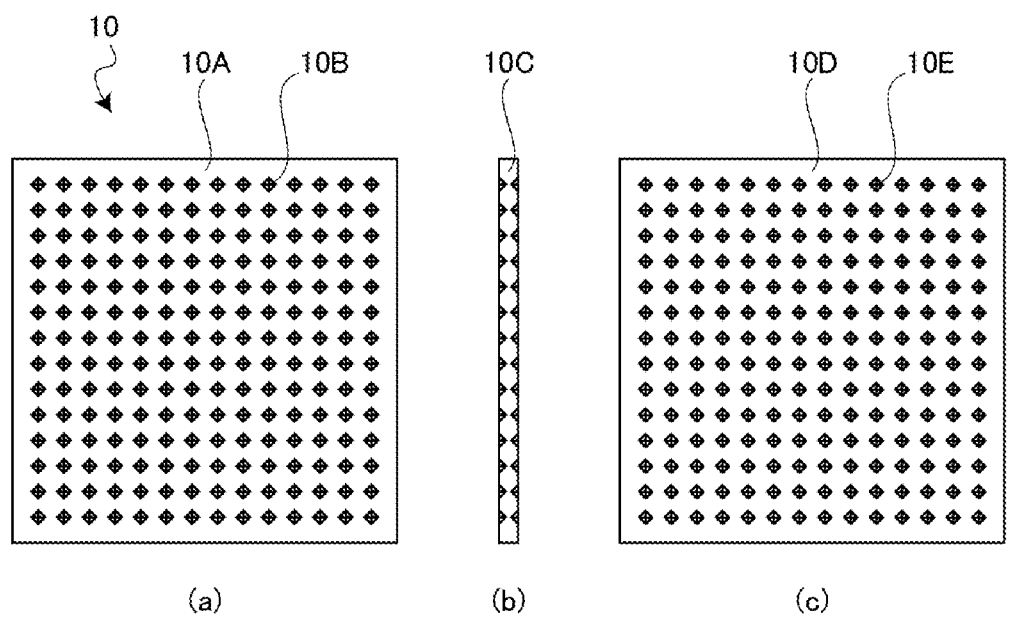
FIG. 1 is a schematic view showing a light guide plate according to a first embodiment of the invention; (a) is a schematic view showing a top surface portion of the light guide plate; (b) is a schematic view showing a side surface portion of the light guide plate; (c) is a schematic view showing a back surface portion of the light guide plate.

Referring to the drawings, preferred embodiments according to the invented manufacturing method for light guide plate are described hereinafter. It is to be noted that the manufacturing method for light guide plate according to the invention is not limited to the description below, but is modifiable properly as far as not deviated from the scope of the spirit of the invention.

First Embodiment

First, a structure of a light guide plate manufactured by a manufacturing method for light guide plate according to the invention is described; then, a fabrication tool and a fabrication apparatus for the light guide plate are described; and further the manufacturing method for light guide plate is described. Finally, an optical specification of the light guide plate manufactured by the manufacturing method for light guide plate according to the invention is described.

First of all, the structure of the light guide plate 10 manufactured by the manufacturing method for light guide plate according to the invention is described with reference to FIG. 1 and FIG. 2.

Figure 2:
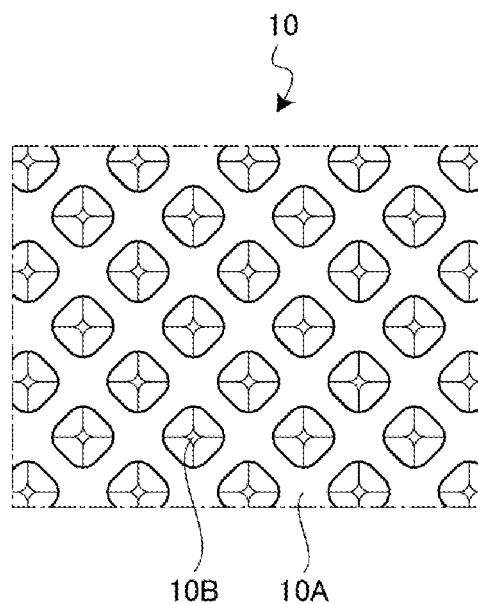
FIG. 2 is a schematic view showing a portion of the top surface portion of the light guide plate according to the first embodiment of the invention.

FIG. 1 is a schematic view showing the light guide plate 10; FIG. 1(a) is the schematic view showing a top surface portion 10A; similarly FIG. 1(b) is a schematic view showing a side surface portion 10C of the light guide plate 10; FIG. 1(c) is a schematic view showing a back surface portion 10D of the light guide plate 10. FIG. 2 is a schematic view showing in an enlarged manner a portion of the top surface portion 10A of the light guide plate 10.

The light guide plate 10 is a plate like member made of, e.g., a poly methyl methacrylate resin plate in a prescribed size, on which plural recess pattern traces are formed. More specifically, the size of the plate like member is in a rectangular shape of, e.g., 100 mm×100 mm through 1450 mm×1030 mm equivalent to B0 size (Japanese Industrial Standard) and corresponds to a thickness of 4 mm through 12 mm As shown in FIG. 1, the top surface portion of the light guide plate 10 is formed with top surface portion recess pattern traces 10B, while the back surface portion of the light guide plate 10 is formed with the back surface portion recess pattern traces 10E. Those pattern traces are formed in a pyramid shape trace having, e.g., a long edge of 0.6 mm and a depth of 0.4 mm and formed as a pitch pattern having molded traces in a matrix shape structured with a pitch of, e.g., 1.2, 1.5, 2.0, or 8.0 mm.

Next, the fabrication tool and the fabrication apparatus for the light guide plate 10 are described. More specifically, a fabrication tool 20 and a fabrication apparatus 30 for forming the recess pattern traces made on the light guide plate 10 are described with reference to FIG. 3 and FIG. 4.

Figure 3:
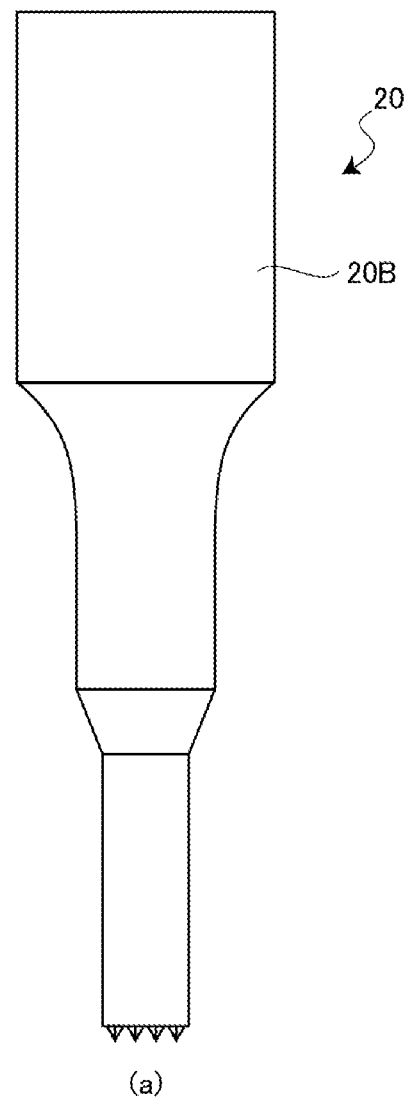
FIG. 3 is a schematic view showing a fabrication tool for embossing process forming a recess pattern trace formed on the light guide plate according to the first embodiment of the invention; (a) is a schematic view showing a supporting portion of the fabrication tool; (b) is a schematic view showing an ultrasonic fabrication portion of the fabrication tool.
Figure 3:
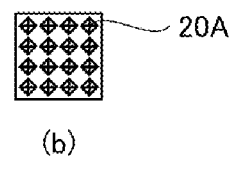
Figure 4:
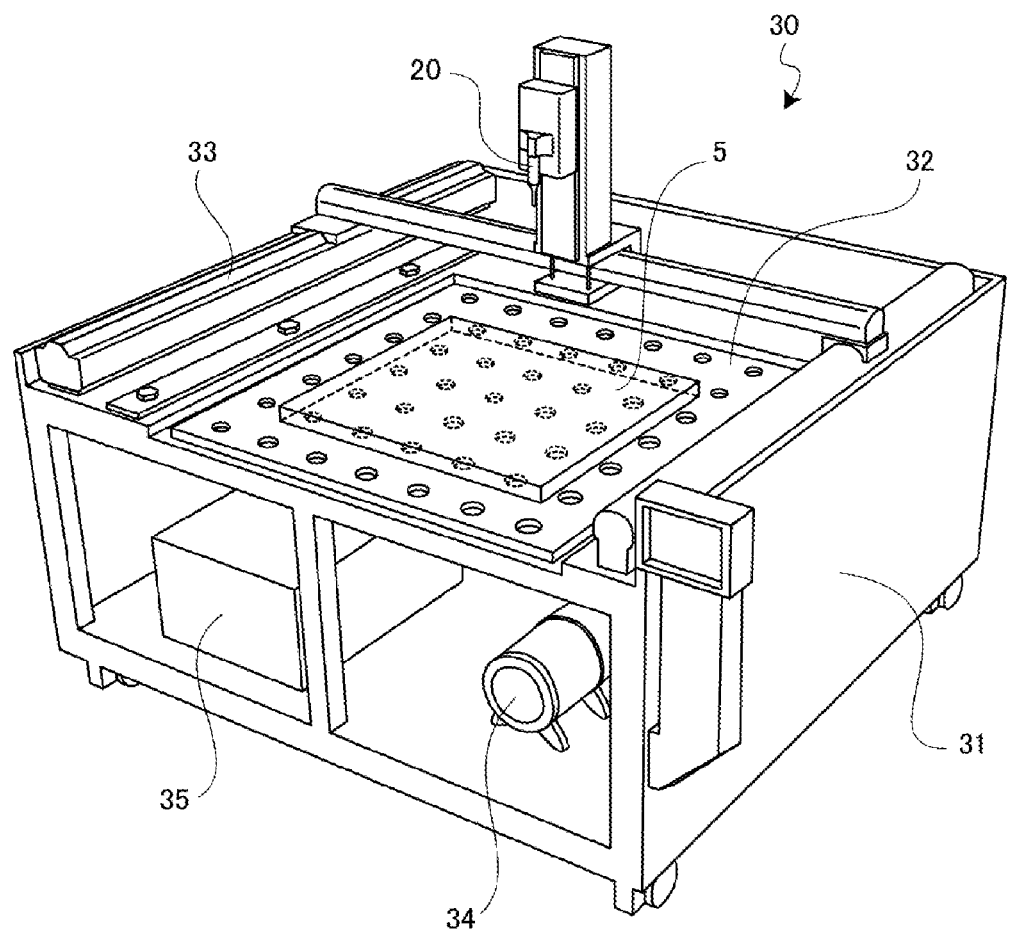
FIG. 4 is a perspective view showing an ultrasonic fabrication apparatus for embossing process forming a recess pattern trace formed on the light guide plate according to the first embodiment of the invention.

FIG. 3 is a schematic view showing the fabrication tool 20 for embossing process forming a recess pattern trace formed on the light guide plate 10; FIG. 3(a) is a schematic view showing a supporting portion 20B of the fabrication tool 20; FIG. 3(b) is a schematic view showing an ultrasonic fabrication portion 20A of the fabrication tool 20. FIG. 4 is a perspective view showing the ultrasonic fabrication apparatus 30 for embossing process forming a recess pattern trace to be formed on the light guide plate 10.

The fabrication tool 20 is a horn for ultrasonic fabrication and includes an ultrasonic fabrication portion 20A at which fabrication dots are arranged in a matrix shape on a distal end surface of the horn for ultrasonic fabrication formed in a rectangular shape, and the supporting portion 20B supporting the ultrasonic fabrication portion 20A. The ultrasonic fabrication portion 20A has fabrication dots respectively in a pyramid shape. In FIG. 2, the ultrasonic fabrication portion 20A is exemplified as having fabrication dots arranged in a four row and four column matrix.

The ultrasonic fabrication apparatus 30 includes an apparatus base 31, a work table 32, a transfer unit 33, a vacuum pump 34, an ultrasonic oscillator 35, and etc. It is to be noted that as the ultrasonic fabrication apparatus 30, an ultrasonic fabrication apparatus registered as registration No. 3140292, which was filed as a utility model application on behalf of the same applicant to this invention, can be used. The light guide plate 10 is manufactured with formation of recess pattern traces on either or both of the top and back sides of the process member upon application to the ultrasonic fabrication portion 20A of the fabrication tool 20 where the supporting portion 20B of the fabrication tool 20 is attached to the ultrasonic fabrication apparatus 30.

More specifically, with the ultrasonic fabrication apparatus 30, the ultrasonic fabrication portion 20A of the fabrication tool 20 is pressed to one major surface of the process member 5, thereby forming, on one major surface of the process member 5, the reflection dots corresponding to the fabrication dots formed on the ultrasonic fabrication portion 20A. The reflection dots are formed in a prescribed range on the one major surface of the process member 5 by repeating formation of the reflection dots upon correlative movements of the fabrication tool 20 with respect to the process member 5. The ultrasonic fabrication portion 20A of the fabrication tool 20 is pressed to the one major surface of the process member 5 such that at least one direction among extending directions of edges of the pyramid shape of the fabrication dot is substantially parallel to an incident direction of the light entering from the side surface of the light guide plate 10 formed by fabricating the process member 5. It is to be noted that a more specific formation method for recess pattern trace in consideration of shape deviations of the process member 5 is described below with reference to FIG. 5.

A manufacturing method for the light guide plate 10 is described next. Specifically, formation for recess pattern trace formed on the light guide plate 10 in consideration of shape deviations of the process member 5 is described below with reference to FIG. 5.

Figure 5:
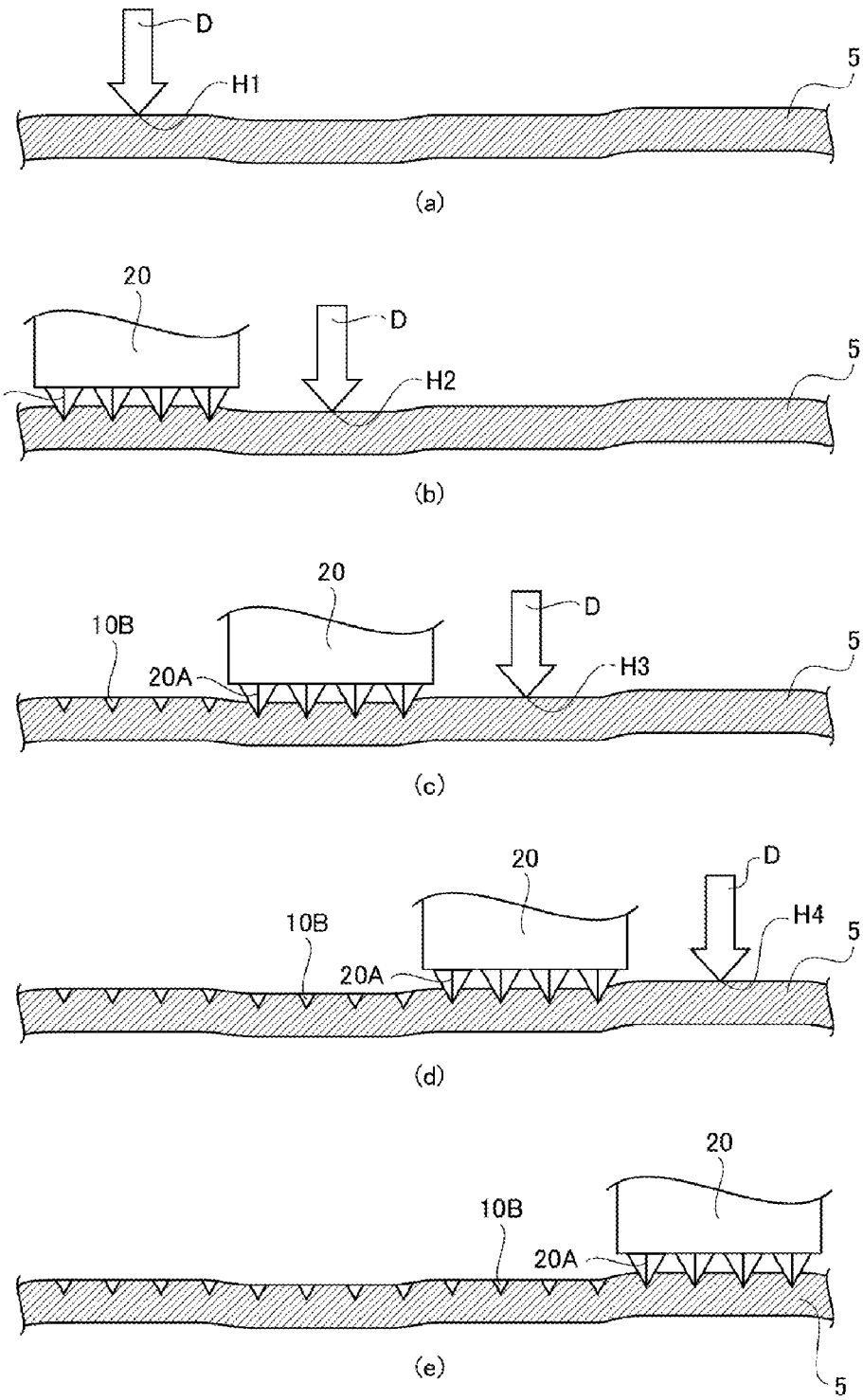
FIG. 5 is a schematic view showing a state of the embossing process forming a recess pattern trace formed on the light guide plate according to the first embodiment of the invention; (a) through (e) are schematic views sequentially showing states of measuring the fabrication start standard height of a process member prior to the embossing process and then performing the embossing process to the process member in compliance with the fabrication start standard height.

FIG. 5 is a schematic view showing a state of the embossing process forming a recess pattern trace formed on the light guide plate 10; FIG. 5(a) through (e) are schematic views sequentially showing states of measuring the fabrication start standard height of a process member 5 prior to the embossing process and then performing the embossing process to the process member 5 in compliance with the fabrication start standard height.

As shown in FIG. 5(a), the fabrication start standard height H1 of the surface of the process member 5 is detected by contacting a movable probe D arranged at a measuring portion, not shown, of the ultrasonic fabrication apparatus 30 with the surface of the process member 5. The process member 5 is made of, e.g., a poly methyl methacrylate resin plate, which is in a prescribed shape and transparent. The probe D is not limited to a mechanical structure, but can has a structure of radiating measuring light out of the measuring portion, not shown, of the ultrasonic fabrication apparatus 30 and receiving the reflected light from the surface of the process member 5.

Similarly, as shown in FIG. 5(b), after the fabrication tool 20 attached to the ultrasonic fabrication apparatus 30 is moved to a position above the top surface portion 10A detecting the fabrication start standard height H1, ultrasonic oscillation is applied to the ultrasonic fabrication portion 20A formed at a distal end of the fabrication tool 20 with respect to the fabrication start standard height H1 as a standard, and the ultrasonic fabrication portion 20A is moved down to a prescribed depth from the fabrication start standard height H1 of the top surface portion 10A. A fabrication start standard height H2 of the surface of the process member 5, serving as a point to be fabricated with ultrasonic application, is detected with a movable type probe D arranged at a measuring portion of the ultrasonic fabrication apparatus 30.

Similarly, as shown in FIG. 5(c), after the fabrication tool 20 attached to the ultrasonic fabrication apparatus 30 is moved to a position above the top surface portion 10A detecting the fabrication start standard height H2, ultrasonic oscillation is applied to the ultrasonic fabrication portion 20A formed at a distal end of the fabrication tool 20 with respect to the fabrication start standard height H2 as a standard, and the ultrasonic fabrication portion 20A is moved down to a prescribed depth from the fabrication start standard height H2 of the top surface portion 10A. A fabrication start standard height H3 of the surface of the process member 5, serving as a point to be fabricated with ultrasonic application is detected with a movable type probe D arranged at a measuring portion of the ultrasonic fabrication apparatus 30.

Similarly, as shown in FIG. 5(d), after the fabrication tool 20 attached to the ultrasonic fabrication apparatus 30 is moved to a position above the top surface portion 10A detecting the fabrication start standard height H3, ultrasonic oscillation is applied to the ultrasonic fabrication portion 20A formed at a distal end of the fabrication tool 20 with respect to the fabrication start standard height H3 as a standard, and the ultrasonic fabrication portion 20A is moved down to a prescribed depth from the fabrication start standard height H3 of the top surface portion 10A. A fabrication start standard height H4 of the surface of the process member 5, serving as a point to be fabricated with ultrasonic application, is detected with a movable type probe D arranged at a measuring portion of the ultrasonic fabrication apparatus 30.

Furthermore, as shown in FIG. 5(e), after the fabrication tool 20 attached to the ultrasonic fabrication apparatus 30 is moved to a position above the top surface portion 10A detecting the fabrication start standard height H4, ultrasonic oscillation is applied to the ultrasonic fabrication portion 20A formed at a distal end of the fabrication tool 20 with respect to the fabrication start standard height H4 as a standard, and the ultrasonic fabrication portion 20A is moved down to a prescribed depth from the fabrication start standard height H4 of the top surface portion 10A.

Figure 6:
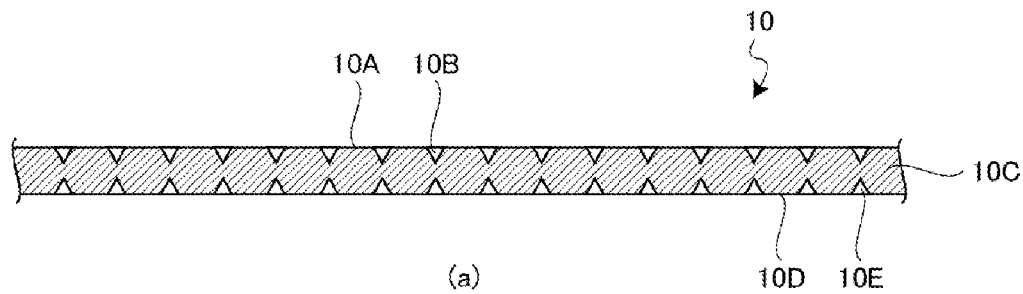
FIG. 6 is a schematic view showing a side surface portion of the light guide plate according to the first embodiment of the invention; (a) is a schematic view showing the side surface portion of the light guide plate in a case where the process member has no curving or deviation in thickness; (b) is a schematic showing the side surface portion of the light guide plate in a case where the process member has some curving or deviation in thickness.
Figure 6:
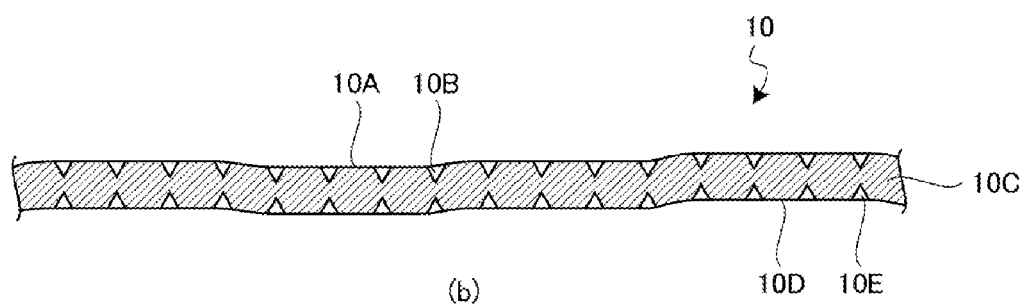
Figure 7:
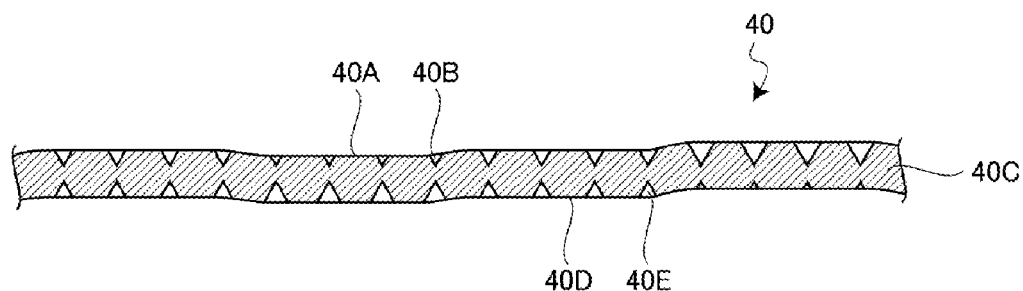
FIG. 7 is a schematic view showing a side surface portion of the light guide plate in a case where the process member has some curving or deviation in thickness during a conventional light guide plate manufacturing.

Next, referring to FIG. 6 and FIG. 7, advantages in association with formation of the recess pattern traces formed on the light guide plate 10 described above are described specifically.

FIG. 6 is a schematic view showing a side surface portion 10C of the light guide plate 10 according to the invention; FIG. 6(a) is a schematic view showing the side surface portion 10C of the light guide plate 10 in a case where the process member 5 has no curving or deviation in thickness; FIG. 6(b) is a schematic showing the side surface portion 10C of the light guide plate 10 in a case where the process member 5 has some curving or deviation in thickness. FIG. 7 is a schematic showing the side surface portion 40A of the conventional light guide plate 40 in a case where the process member 5 has some curving or deviation in thickness during manufacture of the light guide plate 40.

As shown in FIG. 6(a), where the process member 5 has no curving or deviation in thickness, the top surface portion recess pattern traces 10B can be formed with a prescribed depth with respect to the top surface portion 10A regardless the position of the top surface portion 10A of the light guide plate 10 even where not detecting the fabrication start standard height of the top surface portion 10A at each fabrication step. Similarly, the back surface portion recess pattern traces 10E can be formed with a prescribed depth with respect to the back surface portion 10D regardless the position of the back surface portion 10D of the light guide plate 10.

As shown in FIG. 6(b), however, where the process member 5 has some curving or deviation in thickness, the top surface portion recess pattern traces 10B cannot be formed with a prescribed depth with respect to the top surface portion 10A unless detecting the fabrication start standard height of the top surface portion 10A at each fabrication step. Similarly, the back surface portion recess pattern traces 10E cannot be formed with a prescribed depth with respect to the back surface portion 10D unless detecting the fabrication start standard height of the back surface portion 10D at each fabrication step.

The process member 5 serving as a substrate for the light guide plate 10 is made of, e.g., a resin plate, and more specifically, such as a poly methyl methacrylate resin plate may be used. The poly methyl methacrylate resin plate is produced through an extrusion method, and therefore, individual differences in thickness of the poly methyl methacrylate resin plate are about plus or minus 1 mm for 8 mm thickness as the standard value. In addition, deviation in thickness may be large even in a single poly methyl methacrylate resin plate, and more specifically the difference between the maximum thickness and the minimum thickness may become about 0.4 mm The poly methyl methacrylate resin plate may be deformed as to be warped due to absorption of moisture. Thus, the poly methyl methacrylate resin plate is subject to large individual differences, large deviations in thickness, and large differences in thickness components due to being warped. To the contrary, the depth of the top surface portion recess pattern traces 10B formed on the top surface portion 10A of the light guide plate 10 and the depth of the top surface portion recess pattern traces 10E formed on the top surface portion 10D of the light guide plate 10 are set to 0.3 mm to 0.5 mm respectively in many cases.

In the fabrication of the poly methyl methacrylate resin plate of the process member 5 serving as a substrate of the light guide plate 10, it is necessary to make fabrication by moving the ultrasonic fabrication portion 20A down to a prescribed depth from the top surface of the poly methyl methacrylate resin plate while ultrasonic oscillation is applied to the ultrasonic fabrication portion 20A formed at a distal end of the fabrication tool 20 with respect to the fabrication start standard height as a standard, after detection is made by the probe D of the movable type attached to the measuring portion of the ultrasonic fabrication apparatus 30.

If the fabrication start standard height of the surface of the poly methyl methacrylate resin plate is not detected, the top surface portion recess pattern traces 40B cannot be formed with a prescribed depth in a case of the top surface portion 40A of the light guide plate 40, as in a case of the conventional light guide plate 40 shown in FIG. 7. Similarly, the back surface portion recess pattern traces 40E cannot be formed with a prescribed depth in a case of the back surface portion 40D of the light guide plate 40.

Figure 8:
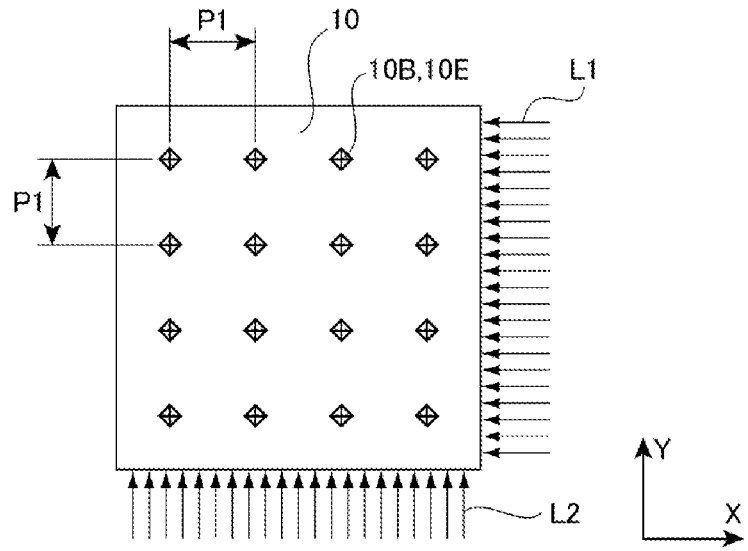

Optical specifications of the light guide plate 10 manufactured by the manufacturing method for the light guide plate 10 are described next. More specifically, the optical specifications in association with recess pattern traces formed on the double sides of the light guide plate 10 are described with reference to FIG. 8. FIG. 8 is a schematic view showing a state that top surface portion recess pattern traces 10B formed on the top surface portion 10A of the light guide plate 10 and back surface portion recess pattern traces 10E formed on the back surface portion 10D are seen through.

The top surface portion recess pattern traces 10B formed on the top surface portion 10A of the light guide plate 10 and the back surface portion recess pattern traces 10E formed on the back surface portion 10D are formed in a plural number in a matrix shape with a pitch P1, respectively. To the top surface portion recess pattern traces 10B and back surface portion recess pattern traces 10E, incident light L1 of an LED light is radiated in a horizontal direction X shown in FIG. 8. Similarly, to the top surface portion recess pattern traces 10B and the back surface portion 10D, incident light L2 of the LED light is radiated in a vertical direction Y shown in FIG. 8. Where the incident light L1 and the incident light L2 of the LED light are radiated to the light guide plate 10, diffused light occurs at each of the top surface portion recess pattern traces 10B and the back surface portion recess pattern traces 10E. The light guide plate 10 therefore can be structured to serve as an area light source of the double side light emitting from the diffused light occurring at the plural recess pattern traces at each of the top surface portion recess pattern traces 10B and the back surface portion recess pattern traces 10E.

With the manufacturing method for light guide plate 10 according to the first embodiment, the ultrasonic fabrication portion 20A of the fabrication tool 20 is pressed to one major surface of the process member 5, thereby forming, on one major surface of the process member 5, the reflection dots at one time corresponding to the fabrication dots arranged in the matrix shape. With the ultrasonic fabrication portion 20A thus formed with the fabrication dots arranged in the matrix shape, the flexible dot fabrication using the ultrasonic multihorn is applicable to the manufacture of the light guide plate relatively large in size of a variety of kinds in a small quantity, thereby grossly reducing the takt time during the production. More specifically, with the ultrasonic fabrication portion 20A having the fabrication dots arranged in the four row and four column (4×4) matrix in the manufacturing method for the light guide plate 10, the takt time during the production can be reduced to one sixteenth (1/16) in comparison with a case that one single fabrication dot is arranged on the ultrasonic fabrication portion 20A.

Second Embodiment

Figure 9:
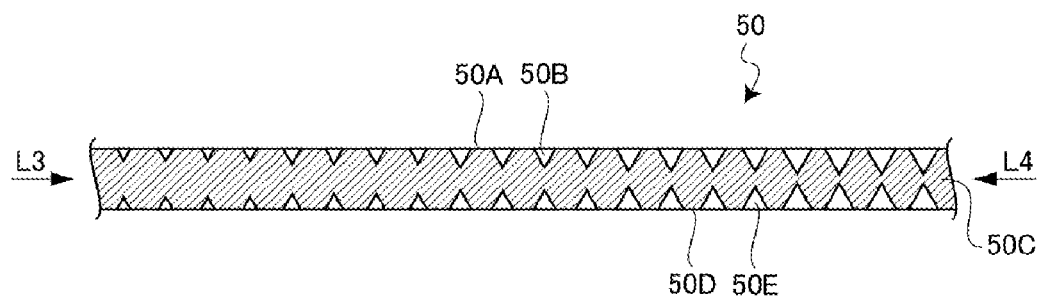
FIG. 9 is a schematic view showing a side surface portion of the light guide plate in a case where, according to a second embodiment of the invention, top surface portion recess pattern traces on the top surface portion and back surface portion recess pattern traces on the back surface portion have different depths from each other.
Figure 10:
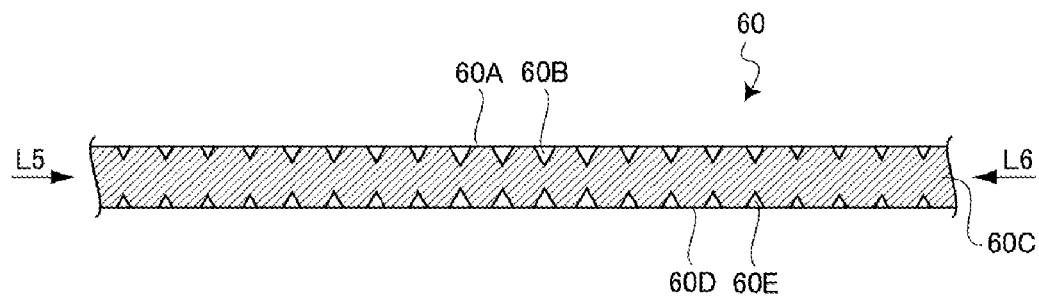
FIG. 10 is a schematic view showing a side surface portion of the light guide plate in a case where, according to the second embodiment of the invention, the top surface portion recess pattern traces on the top surface portion and the back surface portion recess pattern traces on the back surface portion have different depths from each other.

Next, structures of a light guide plate 50 and a light guide plate 60 according to the second embodiment are described in reference to FIG. 9 and FIG. 10. It is to be noted that FIG. 9 is a schematic view showing a side surface portion 50C of the light guide plate 50 in a case where top surface portion recess pattern traces 50B and back surface portion recess pattern traces 50E have different depths from each other. Similarly, FIG. 10 is a schematic view showing a side surface portion 60C of the light guide plate 60 in a case where the top surface portion recess pattern trace 60B and the back surface portion recess pattern trace 60E have different depth from each other.

The light guide plate 50 and the light guide plate 60 according to the second embodiment have a feature that recess pattern traces on the top surface portion and on the back surface portion have depths different in a stepwise manner from each other, as different from the top surface portion recess pattern traces 10B and the back surface portion recess pattern traces 10E, which have an approximately uniform depth formed in the light guide plate 10 according to the first embodiment of the invention. Structures other than those of the light guide plate 50 and the light guide plate 60 are substantially the same as the structures of the light guide plate 10 described in the first embodiment. With respect to the light guide plate 50 and the light guide plate 60 according to the second embodiment, such as structures and advantages in association of the depth of the recess pattern traces different from the light guide plate 10 of the first embodiment, are specifically described.

In the light guide plate 50 shown in FIG. 9, the depth of the top surface portion recess pattern traces 50B of the top surface portion 50A and the depth of the back surface portion recess pattern traces 50E are formed to be deeper in a stepwise manner. More specifically, when seen from the side surface portion 50C, the recess pattern traces are formed so that the recess pattern traces on the top and back surfaces on the right side in FIG. 9 become deeper in the stepwise manner than the recess pattern traces on the top and back surfaces on the left side in FIG. 9. Emission of the diffused light can be made averaged by changing the reflection areas of the recess pattern traces located closer to the left side of FIG. 9 from a small one to a large one because the light density becomes higher as coming closer to the light source and becomes lower as going remoter to the light source according to their optical characteristics where incident light L3 of the LED light is radiated from the left side of the side surface portion 50C in FIG. 9. Emission of the diffused light may not be averaged as being large on the right side and small on the left side by changing the reflection areas of the recess pattern traces located closer to the right side of FIG. 9 from a large one to a small one where incident light L4 of the LED light is radiated from the right side of the side surface portion 50C in FIG. 9 due to the reasons described above. That is, the recess pattern trace fabrication is an advantageous fabrication method when the light source is used on one side.

In the light guide plate 60 shown in FIG. 10, the top surface portion recess pattern traces 60B on the top surface portion 60A and the back surface portion recess pattern traces 60E on the back surface portion 60D are formed in having deeper depths as proceeding to a center portion of the light guide plate 60, and that is, the traces are formed to be shallow on the opposite end sides and deep at the center portion. The diffused light at the recess pattern traces on a left side in FIG. 10 have their emission averaged by changing the reflection areas of the recess pattern traces reaching the center portion in FIG. 10 from a small one to a large one because the light density becomes higher as coming closer to the light source and becomes lower as going remoter to the light source according to their optical characteristics as going from the left side to the right side in FIG. 10 where incident light L5 of the LED light is radiated from a left side of the side surface portion 60C in FIG. 10. Similarly, the diffused light at the recess pattern traces on a right side in FIG. 10 have their emission averaged by changing the reflection areas of the recess pattern traces located on a left side reaching the center portion in FIG. 10 from a small one to a large one because the light density becomes higher as coming closer to the light source and becomes lower as going remoter to the light source according to their optical characteristics as going from the right side to the left side in FIG. 10 where incident light L6 of the LED light is radiated from a right side of the side surface portion 60C in FIG. 10. Accordingly, the entire emission of the diffused light becomes averaged. That is, this recess pattern trace fabrication constitutes an advantageous fabrication method when the light sources for both of the opposite ends are used.

According to the manufacturing method for the light guide plate 50 and the light guide plate 60 of the second embodiment, the reflection dots can be formed with plural arbitrary depths onto the one major surface of the process member 5 by pressing the ultrasonic fabrication portion 20A of the fabrication tool 20 deeply or shallowly in the stepwise manner to the one major surface of the process member 5. With the manufacturing method thus described for the light guide plate 50 and the light guide plate 60, the diffused light can be taken out or emitted in corresponding to a required light emission area size, thereby optimizing the manufacture of the light guide plates in comply with arbitrary specifications.

Third Embodiment

Figure 11:
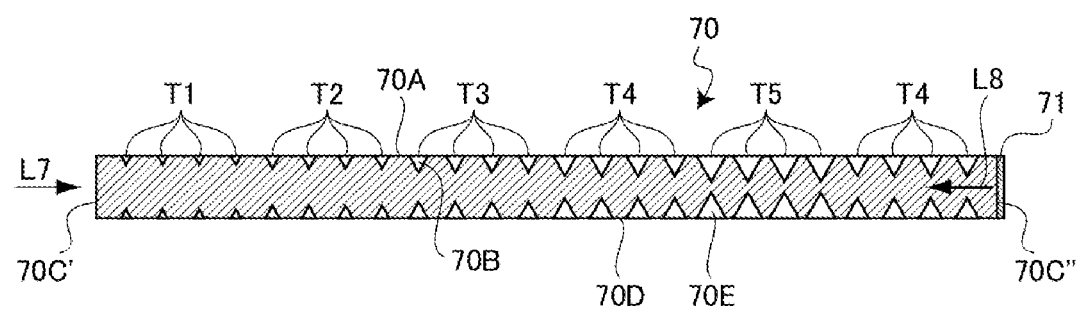
FIG. 11 is a schematic view showing a side surface portion of the light guide plate in a case where, according to a third embodiment of the invention, the top surface portion recess pattern trace on the top surface portion and the back surface portion recess pattern trace on the back surface portion have different depths from each other.

Referring to FIG. 11, a structure of the light guide plate 70 according to the third embodiment is described. It is to be noted that FIG. 11 is a schematic view showing a side surface portion of a light guide plate 70 having different depths of the top surface portion recess pattern traces 70B and the back surface portion recess pattern traces 70E and a reflection tape 71 adhering to the light guide plate 70.

The light guide plate 70 according to the third embodiment has a feature that having the recess pattern traces on the top and back surface portions with depths different in a stepwise manner, as different from the top surface portion recess pattern traces 10B and the back surface portion recess pattern traces 10E formed in the light guide plate 10 with an approximately uniform depth according to the first embodiment, and that adhering the reflection tape 71 on one side of the side surface portion of the light guide plate 70. The structures of the light guide plate 70 other than those are substantially the same as the structures of the light guide plate 10 described in the first embodiment. In the light guide plate 70 of the third embodiment, such as structures and advantages in association with the depth of the recess pattern traces different from the light guide plate 10 in the first embodiment are described specifically.

With respect to the structure of the light guide plate 70, the depth of the top surface portion recess pattern traces 70B on the top surface portion 70A and the depth of the back surface portion recess pattern traces 70E on the back surface portion 70D are formed to be deeper in a stepwise manner as proceeding from a side surface portion 70C' on a left side of FIG. 11 to a side surface portion 70C" on a right side. Both of the depths of the top surface portion recess pattern traces 70B on the top surface portion 70A and the depths of the back surface portion recess pattern traces 70E on the back surface portion 70D are formed to be shallow correlatively at the side surface portion 70C" on a right side in FIG. 11. More specifically, the top surface portion recess pattern traces 70B on the top surface portion 70A shown in FIG. 11, for example, may have the depths of the recess pattern traces in which the recess pattern traces T1 have the shallowest depth, in which the recess pattern traces T5 have the deepest depth, and in which the recess pattern traces have a relationship of T1<T2<T3<T4<T5.

Regarding advantages in association with the optical characteristics of the light guide plate 70, emission of the diffused light is averaged at the top surface portion 70A and the back surface portion 70D by changing the reflection areas of the recess pattern traces from a small one to a large one because the light density becomes higher as coming closer to the light source and becomes lower as going remoter to the light source according to their optical characteristics as going from the left side in FIG. 11 where incident light L7 of the LED light is radiated from the side surface portion 70C' on a left side of in FIG. 11. Reflected light L8 occurs upon reflection of the incident light L7 of the LED light at the side surface portion 70C"by means of the reflection tape 71 adhering to the side surface portion 70C" of the light guide plate 70. A rate that the LED light is converted into the diffused light increases since the reflected light L8 is converted into the diffused light at the recess pattern traces. The reflected light L8 thus occurring affects the diffused light at the recess pattern traces near the side surface portion 70C". At the side surface portion 70C", the depth of the top surface portion recess pattern traces 70B on the top surface portion 70A and the depth of the back surface portion recess pattern traces 70E on the back surface portion 70D are formed to be shallower correlatively.

With the manufacturing method for the light guide plate 70 according to the third embodiment, the reflection dots can be formed with plural arbitrary depths onto the one major surface of the process member 5 by pressing the ultrasonic fabrication portion 20A of the fabrication tool 20 deeply or shallowly in the stepwise manner to the one major surface of the process member 5. With the manufacturing method thus described for the light guide plate 70, the diffused light can be uniformly taken out or emitted in corresponding to a required light emission area size even where it is structured that the reflection tape 71 adheres to one side of the side surface portion of the light guide plate 70, thereby optimizing the manufacture of the light guide plates in comply with arbitrary specifications.

Description of Reference Numbers

5 Process Member, 10 Light Guide Plate, 10A Top Surface Portion, 10B Top Surface Portion Recess Pattern Trace, 10C Side Surface Portion, 10D Back Surface Portion, 10E Back Surface Portion Recess Pattern Trace, 20 Fabrication Tool, 20A Ultrasonic Fabrication Portion, 20B Supporting Portion, 30 Ultrasonic Fabrication Apparatus, 31 Apparatus Base, 32 Work Table, 33 Transfer Unit, 34 Vacuum Pump, 35 Ultrasonic Oscillator, 40 Light Guide Plate, 40A Top Surface Portion, 40B Top Surface Portion Recess Pattern Trace, 40C Side Surface Portion, 40D Back Surface Portion, 40E Back Surface Portion Recess Pattern Trace, 50 Light Guide Plate, 50A Top Surface Portion, 50B Top Surface Portion Recess Pattern Trace, 50C Side Surface Portion, 50D Back Surface Portion, 50E Back Surface Portion Recess Pattern Trace, 60 Light Guide Plate, 60A Top Surface Portion, 60B Top Surface Portion Recess Pattern Trace, 60C Side Surface Portion, 60D Back Surface Portion, 60E Back Surface Portion Recess Pattern Trace, 70 Light Guide Plate, 70A Top Surface Portion, 70B Top Surface Portion Recess Pattern Trace, 70C' 70C" Side Surface Portion, 70D Back Surface Portion, 70E Back Surface Portion Recess Pattern Trace, 71 Reflection Tape, D Probe, H1 to H4 Fabrication Start Standard Height, P1 Pitch, L1 to L7 Incident Light, L8 Reflected Light, T1 to T5 Recess Pattern Trace.

What is claimed is:

1. A method for manufacturing a light guide plate for guiding light that enters the light guide plate from a side surface of the light guide plate to output the light from two major surfaces of the light guide plate that are opposite each other, the method comprising:

arranging fabrication dots in a matrix shape at a rectangular, outer surface of an ultrasonic fabrication horn; and forming, on both of the two major surfaces of the light guide plate that are opposite each other, reflection dots corresponding to the fabrication dots by pressing said outer surface of the ultrasonic fabrication horn to said major surfaces to form a group of the reflection dots, and moving the ultrasonic fabrication horn with respect to the light guide plate in a movement that correlates to the pressing, to form the remainder of the reflection dots, a subset of the reflection dots each having a depth so that the depths of respective reflection dots of the subset of the reflection dots increase in a stepwise manner as a distance of the respective reflection dots of the subset of the reflection dots from a light source increases.

2. The method according to claim 1, wherein the reflection dots are formed in a pyramid shape.

3. The method according to claim 2, wherein in the forming, at least one edge of the pyramid shape of the reflection dots is positioned substantially parallel to an incident direction of the light that enters into the light guide plate.

4. The method according to claim 1, wherein in the forming, the ultrasonic fabrication horn correlatively moves by a range of the outer surface with respect to the light guide plate after forming the group of the reflection dots, to form the remainder reflection dots.

5. The method according to claim 1, further comprising securing the light guide plate on a securing table with respect to a direction in the major surfaces.

6. The method according to claim 1, wherein the light guide plate is a flat plate made of a transparent resin.

7. The method according to claim 1, wherein the light guide plate is a curable, transparent resin.

8. A method for manufacturing a light guide plate for guiding light from a light source, the light guide plate guiding the light from a side surface of the light guide plate to output the light from two major surfaces of the light guide plate that are opposite each other, the method comprising:
    arranging fabrication dots in a matrix shape on an outer surface of an ultrasonic fabrication horn; and
    forming, on both of the two major surfaces of the light guide plate that are opposite each other, reflection dots corresponding to the fabrication dots by repeatedly performing the following
        pressing said fabrication dots against the two major surfaces, and
        moving the ultrasonic fabrication horn relative to the two major surfaces,
    a subset of the reflection dots each having a depth so that in a direction away from the light source, the depths of the subset of reflection dots increase in a stepwise manner.

* * * * *